United States Patent
Boxey

(10) Patent No.: US 6,234,516 B1
(45) Date of Patent: May 22, 2001

(54) INFLATABLE CURTAIN

(75) Inventor: Kevin J. Boxey, Columbianville, MI (US)

(73) Assignee: TRW Vehicle Safety System Inc., Lyndhurst, OH (US)

( * ) Notice: Subject to any disclaimer, the term of this patent is extended or adjusted under 35 U.S.C. 154(b) by 0 days.

(21) Appl. No.: 09/327,780

(22) Filed: Jun. 7, 1999

(51) Int. Cl.⁷ ..................................................... B60R 21/24
(52) U.S. Cl. .......................................... 280/730.2; 280/729
(58) Field of Search .............................. 280/728.1, 728.2, 280/729, 730.1, 730.2

(56) References Cited

U.S. PATENT DOCUMENTS

| | | |
|---|---|---|
| 5,333,899 | 8/1994 | Witte . |
| 5,524,924 | 6/1996 | Steffens, Jr. et al. . |
| 5,788,270 | 8/1998 | Haland et al. . |
| 5,791,683 | 8/1998 | Shibata et al. . |
| 5,791,685 * | 8/1998 | Lachat et al. ............... 280/730.2 |
| 5,829,779 * | 11/1998 | Nakashima et al. ............. 280/729 |
| 5,884,937 | 3/1999 | Yamada . |
| 5,924,723 * | 7/1999 | Brantman et al. ............ 280/730.2 |
| 6,010,149 * | 1/2000 | Riedel et al. ................ 280/730.2 |
| 6,022,044 * | 2/2000 | Cherry ....................... 280/728.2 |
| 6,042,141 * | 3/2000 | Welch et al. ................. 280/730.2 |
| 6,073,961 * | 6/2000 | Bailey et al. ................. 280/730.2 |
| 6,082,761 * | 7/2000 | Kato et al. ................... 280/730.2 |
| 6,095,551 * | 8/2000 | O'Docherty .................. 280/730.2 |
| 6,102,435 * | 8/2000 | Wallner et al. ............... 280/730.2 |

FOREIGN PATENT DOCUMENTS 19743626  4/1998  (DE) .

* cited by examiner

Primary Examiner—Daniel G. DePumpo
Assistant Examiner—Christopher Bottorff
(74) Attorney, Agent, or Firm—Tarolli, Sundheim, Covell, Tummino & Szabo L.L.P.

(57) ABSTRACT

Apparatus (10) for helping to protect an occupant of a vehicle (12) which has a side structure (16) and a roof (18) comprises an inflatable vehicle occupant protection device (14). The vehicle occupant protection device (14) has a stored position extending along the side structure (16) adjacent to the roof (18) of the vehicle (12). The vehicle occupant protection device (14) has first and second portions (34 and 40) inflatable into a position between the side structure (16) of the vehicle (12) and a vehicle occupant. The second portion (40) is folded and overlies the first portion (34). An inflator (24) provides inflation fluid for inflating the vehicle occupant protection device (14). The second portion (40) when inflated unfolds into a position overlying a pillar (60) of the vehicle (12) and covering at least a portion of the pillar (60).

11 Claims, 2 Drawing Sheets

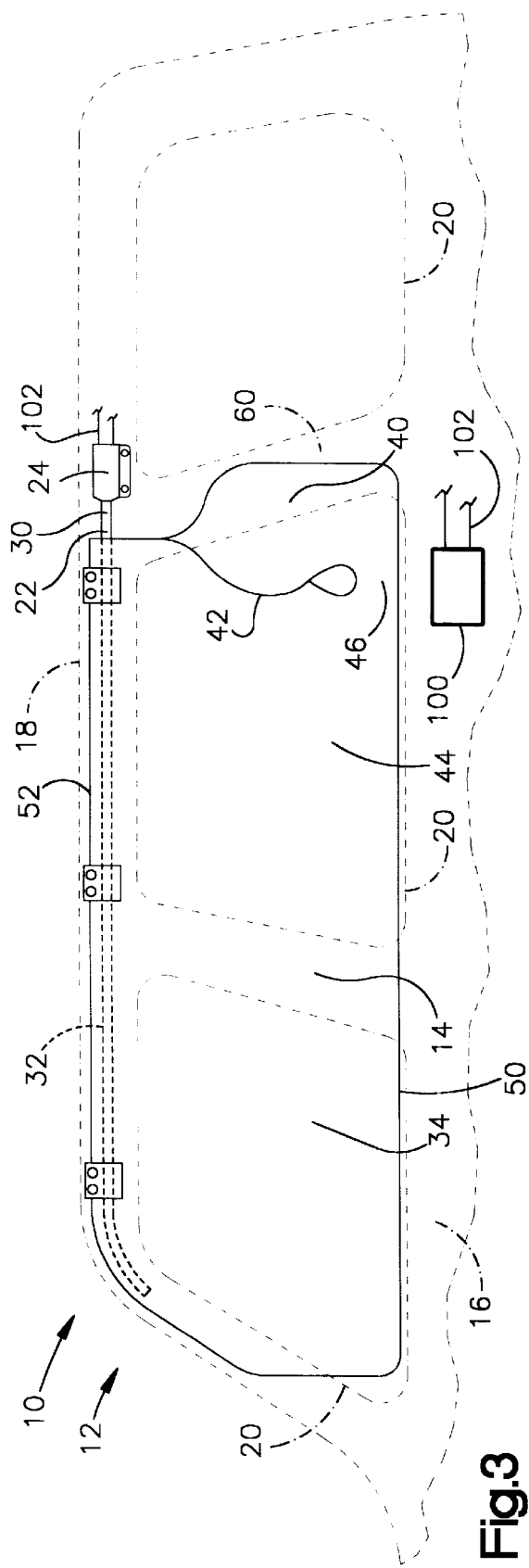
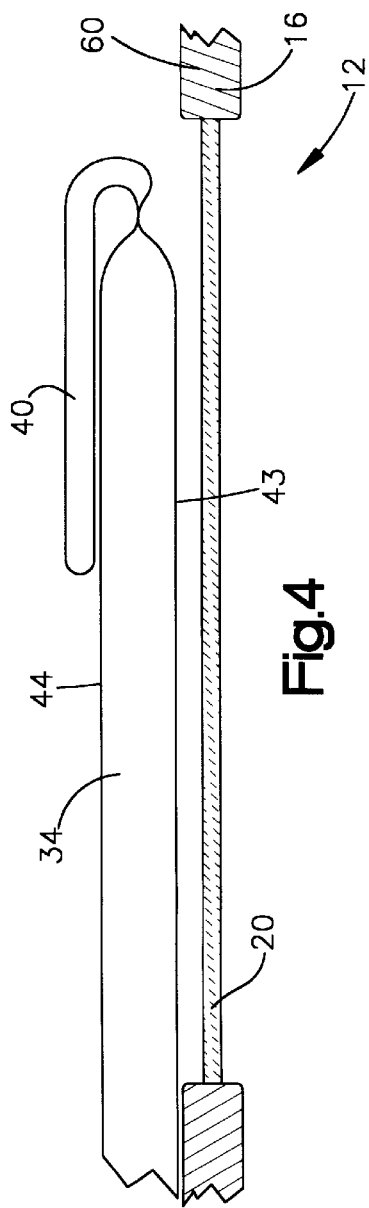
Fig.3
Fig.4

INFLATABLE CURTAIN

FIELD OF THE INVENTION

The present invention relates to an inflatable vehicle occupant protection device for helping to protect a vehicle occupant in the event of a side impact to a vehicle and/or a vehicle rollover.

BACKGROUND OF THE INVENTION

It is known to inflate a vehicle occupant protection device to help protect a vehicle occupant in the event of a vehicle collision. An inflatable curtain which is inflatable from the roof of the vehicle downward inside the passenger compartment between a vehicle occupant and the side structure of the vehicle in the event of a side impact or rollover is also known. Such an inflatable curtain is inflated from a deflated condition by inflation fluid directed from an inflator to the inflatable curtain through a fill tube.

SUMMARY OF THE INVENTION

The present invention relates to an apparatus for helping to protect an occupant of a vehicle which has a side structure and a roof. The apparatus comprises a vehicle occupant protection device which has a stored position extending along the side structure adjacent to the roof of the vehicle. The vehicle occupant protection device has first and second portions inflatable into a position between the side structure of the vehicle and a vehicle occupant. The second portion is folded and overlies the first portion. An inflator provides inflation fluid for inflating the vehicle occupant protection device. The second portion when inflated unfolds into a position overlying a pillar of the vehicle and covering at least a portion of the pillar.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 3 is a schematic view of the vehicle safety apparatus of FIG. 1 in an inflated condition; and FIG. 4 is a schematic sectional view of the vehicle safety apparatus taken along line 4—4 in FIG. 2.

DESCRIPTION OF PREFERRED EMBODIMENTS

Figure 1:
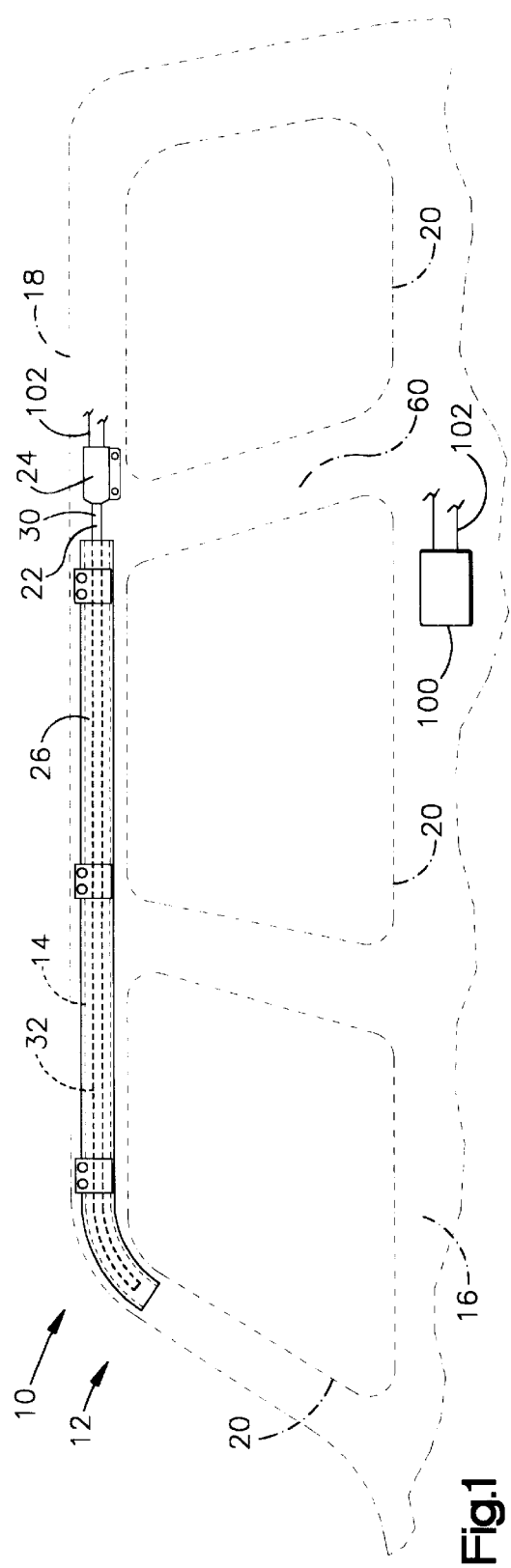
FIG. 1 is a schematic view of an inflatable vehicle safety apparatus of the present invention in a deflated condition.
Figure 2:
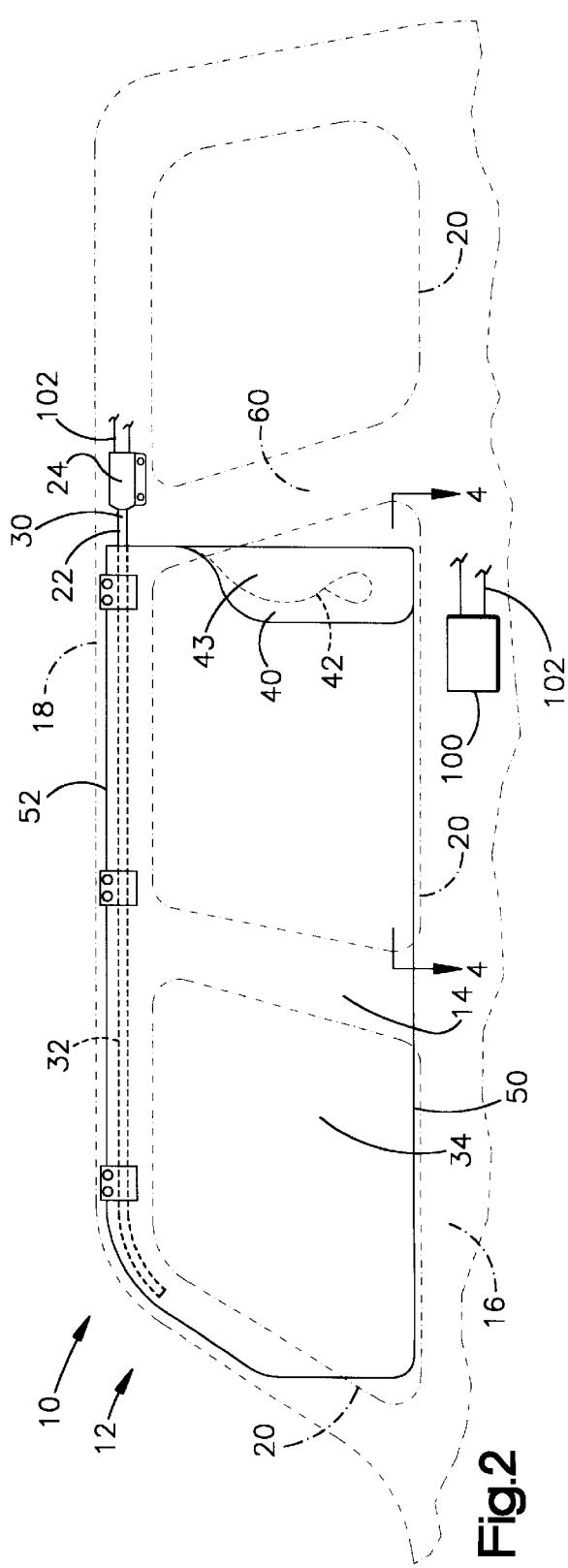
FIG. 2 is a schematic view of the vehicle safety apparatus of FIG. 1 in a partially inflated condition.

As representative of the present invention and as illustrated in FIGS. 1–3, apparatus 10 for helping to protect an occupant of a vehicle 12 comprises an inflatable vehicle occupant protection device 14. The vehicle 12 includes a side structure 16 and a roof 18. The side structure 16 of the vehicle 12 includes side windows 20. The vehicle occupant protection device 14 is mounted along the side structure 16 adjacent to the roof 18 of the vehicle 12. An inflator 24 is connected in fluid communication with the vehicle occupant protection device 14 through a fill tube 22.

As best viewed in FIGS. 2–3, the fill tube 22 has a first end portion 30 for receiving fluid from the inflator 24. The fill tube 22 has a second end portion 32 which is disposed in a first portion 34 of the vehicle occupant protection device 14. The second end portion 32 of the fill tube 22 has a plurality of openings (not shown) that provide fluid communication between the fill tube 22 and the first portion 34 of the vehicle occupant protection device 14.

The inflator 24 contains a stored quantity of pressurized inflation fluid (not shown) in the form of a gas to inflate the vehicle occupant protection device 14. The inflator 24 alternatively could contain a combination of pressurized inflation fluid and ignitable material for heating the inflation fluid, or could be a pyrotechnic inflator which uses the combustion of gas-generating material to generate inflation fluid.

The inflatable curtain 14 is formed from a sheet of material that is folded over to form an outer panel 43 (FIGS. 2 and 4) and an overlying inner panel 44 (FIGS. 2–4). The outer panel 43 and inner panel 44 are secured to each other along the perimeter of the inflatable curtain 14 by known means such as stitching (not shown). When the inflatable curtain 14 is in the inflated condition, the outer panel 43 is positioned adjacent to the side structure 16 of the vehicle 12. It should be understood, however, that alternative constructions of the inflatable curtain 14 could be used without negatively affecting its functionality.

The vehicle occupant protection device 14 includes a second portion 40 adjacent to the first portion 34. The first and second portions 34 and 40 are defined by stitching 42 (FIGS. 2 and 3) that secures the outer panel 43 to the inner panel 44. A passage 46 provides fluid communication between the first and second portions 34 and 40. The passage 46 is located adjacent to a bottom edge 50 of the vehicle occupant protection device 14, opposite a top edge 52 positioned adjacent to the roof 18 of the vehicle 12.

In a folded condition illustrated in FIG. 2, the second portion 40 of the vehicle occupant protection device 14 is folded into a position overlying the first portion 34. As illustrated in FIG. 4, when the vehicle occupant protection device 14 is in the folded condition, the first portion 34 is positioned between the second portion 40 and the side structure 16 of the vehicle 12 when the first portion 34 is inflated and prior to inflation of the second portion 40.

The vehicle occupant protection device 10 includes a housing 26 (FIG. 1) that stores the deflated vehicle occupant protection device 14 in the folded condition. The fill tube 22, the deflated vehicle occupant protection device 14, and housing 26 have an elongated configuration and extend along the roof 18 and the side structure 16 of the vehicle 12 above the side windows 20.

The vehicle 12 includes a sensor mechanism 100 (shown schematically in FIGS. 1–3) for sensing a side impact to the vehicle 12 and/or a rollover of the vehicle 12. The sensor mechanism 100 actuates the inflator 24 in response to the sensing of a side impact or a vehicle rollover.

In the event of a rollover of the vehicle or a side impact to the vehicle 12 of a magnitude greater than a predetermined threshold value, the sensor mechanism 100 provides an electrical signal over lead wires 102 to the inflator 24. The electrical signal causes the inflator 24 to be actuated in a known manner. The inflator 24 discharges fluid under pressure into the fill tube 22. The fill tube 22 directs the fluid into the first portion 34 (FIGS. 2 and 3) of the vehicle occupant protection device 14.

The vehicle occupant protection device 14 inflates under the pressure of the inflation fluid from the inflator 24. The housing 26 (FIG. 1) opens and the vehicle occupant protection device 14 (FIGS. 2 and 3) inflates into a position extending fore and aft in the vehicle 12 along the side structure 16 of the vehicle 12. The inflated device 14 is also positioned between the side structure 16 of the vehicle 12 and any occupant of the vehicle 12.

In the illustrated embodiment, the second portion 40 of the vehicle occupant protection device 14 is inflated after the first portion 34. As shown in FIG. 2, the first portion 34 inflates in a first direction away from the roof 18 and along the side structure 16 of the vehicle 12. The first portion 34 inflates downward as shown in the drawings and in a downward direction with respect to the direction of travel of the vehicle 12 to a position adjacent to the side structure 16. Once the first portion 34 inflates and moves into the position illustrated in FIG. 2, inflation fluid is communicated to the second portion 40 through the passage 46.

The second portion 40, when inflated, unfolds and/or pivots away from the first portion 34 and moves in a second direction from the position illustrated in FIG. 2 to the position illustrated in FIG. 3. When the vehicle occupant protection device 14 is inflated, the second portion 40 extends from the first portion 34 generally parallel to the direction of forward travel of the vehicle 12. In the inflated condition, the second portion 40 of the vehicle occupant protection device 14 extends along the side structure 16 of the vehicle 12 and overlies and covers at least a portion of a C pillar 60 of the vehicle 12.

It will be recognized by those skilled in the art that the second portion 40 of the vehicle occupant protection device 14 may begin to inflate before the first portion 34 is completely inflated. This is because some inflation fluid that enters the first portion 34 may pass through the passage 46 and enter the second portion 40 before the first portion 34 is completely inflated.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for helping to protect an occupant of a vehicle which has a side structure and a roof, said apparatus comprising:
    an inflatable vehicle occupant protection device having a stored position extending along the side structure adjacent to the roof of the vehicle, said vehicle occupant protection device having first and second portions inflatable into a position between the side structure of the vehicle and a vehicle occupant, said second portion being folded and overlying said first portion; and
    an inflator for providing inflation fluid for inflating said vehicle occupant protection device;
    said second portion unfolding when inflated into a position overlying a pillar of the vehicle, said second portion covering at least a portion of said pillar.

2. Apparatus as defined in claim 1, further including a fill tube having a portion located in said first portion of said vehicle occupant protection device, said inflator being in fluid communication with said fill tube, said inflator, when actuated, providing inflation fluid to said fill tube, said fill tube directing said inflation fluid into said first portion of said vehicle occupant protection device to inflate said vehicle occupant protection device.

3. Apparatus as defined in claim 1, wherein said vehicle occupant protection device further comprises a passage that provides fluid communication between said first and second portions of said vehicle occupant protection device, said passage being located adjacent a bottom edge of said vehicle occupant protection device, said bottom edge being located opposite a top edge of said vehicle occupant protection device adjacent to the roof of the vehicle.

4. Apparatus as defined in claim 3, wherein passage directs said inflation fluid from said first portion into said second portion when said vehicle occupant protection device is inflated.

5. Apparatus as defined in claim 1, wherein said pillar of the vehicle is a C pillar.

6. Apparatus for helping to protect an occupant of a vehicle which has a side structure and a roof, said apparatus comprising:
    an inflatable vehicle occupant protection device having a stored position extending along the side structure adjacent to the roof of the vehicle, said vehicle occupant protection device having a first portion inflatable in a first direction into a position between the side structure of the vehicle and a vehicle occupant and a second portion inflatable in a second direction, different than said first direction, into a position between the side structure of the vehicle and the vehicle occupant, said second portion being inflated in said second direction after said first portion is inflated in said first direction to overlie at least a portion of a pillar of the vehicle; and
    an inflator for providing inflation fluid for inflating said vehicle occupant protection device.

7. Apparatus as defined in claim 6, further including a fill tube having a portion located in said first portion of said vehicle occupant protection device, said inflator being in fluid communication with said fill tube, said inflator, when actuated, providing inflation fluid to said fill tube, said fill tube directing said inflation fluid into said first portion of said vehicle occupant protection device to inflate said vehicle occupant protection device.

8. Apparatus as defined in claim 6, wherein said vehicle occupant protection device further comprises a passage that provides fluid communication between said first and second portions of said vehicle occupant protection device, said passage being located adjacent a bottom edge of said vehicle occupant protection device, said bottom edge being located opposite a top edge of said vehicle occupant protection device adjacent to the roof of the vehicle.

9. Apparatus as defined in claim 8, wherein said vehicle occupant protection device has a folded condition wherein said second portion is folded into a position overlying said first portion, said first portion being positioned between said second portion and the side structure of the vehicle when said first portion is inflated and prior to inflation of said second portion, said vehicle occupant protection device being in said folded condition when said vehicle occupant protection device is in said stored condition.

10. Apparatus as defined in claim 9, wherein said first portion of said vehicle occupant protection device is inflated in said first direction away from the roof along the side structure of the vehicle, said passage directing said inflation fluid from said first portion into said second portion, said second portion when inflated being unfolded away from said first portion, said second portion extending in said second direction, transverse to said first direction, along the side structure of the vehicle.

11. Apparatus as defined in claim 10, wherein said second portion of said vehicle occupant protection device is inflated in said second direction into a position overlying a C pillar of the vehicle, said second portion covering at least a portion of said C pillar.

* * * * *